(12) United States Patent
Kaneko et al.

(10) Patent No.: US 6,421,878 B1
(45) Date of Patent: Jul. 23, 2002

(54) TILTING HINGE

(75) Inventors: Takayuki Kaneko; Hideya Tajima, both of Kanagawa (JP)

(73) Assignee: Katoh Electrical Machinery Co., Ltd., Kanagawa (JP)

( * ) Notice: Subject to any disclaimer, the term of this patent is extended or adjusted under 35 U.S.C. 154(b) by 0 days.

(21) Appl. No.: 09/619,399

(22) Filed: Jul. 19, 2000

(30) Foreign Application Priority Data

Jul. 22, 1999 (JP) .......................................... 11-208203
Jul. 27, 1999 (JP) .......................................... 11-212830

(51) Int. Cl.$^7$ .......................... E05D 11/10; E05C 17/64
(52) U.S. Cl. .............................. 16/330; 16/337; 16/340; 361/681
(58) Field of Search .................. 16/330, 327, 337–340, 16/342; 403/103, 111, 120; 361/707, 711, 680, 681

(56) References Cited

U.S. PATENT DOCUMENTS

| | | | | |
|---|---|---|---|---|
| 5,109,570 A | * | 5/1992 | Okada et al. .................. | 16/289 |
| 5,208,944 A | * | 5/1993 | Lu .............................. | 16/278 |
| 5,269,047 A | * | 12/1993 | Lu .............................. | 16/340 |
| 5,894,633 A | * | 4/1999 | Kaneko ...................... | 16/337 |
| 5,913,351 A | * | 6/1999 | Miura ......................... | 16/340 |
| 5,970,819 A | * | 10/1999 | Katoh ......................... | 16/340 |
| 6,081,969 A | * | 7/2000 | Tanahashi et al. ............ | 16/337 |
| 6,163,298 A | * | 12/2000 | Chung ........................ | 16/342 |

FOREIGN PATENT DOCUMENTS

JP          962399          3/1997

* cited by examiner

Primary Examiner—Chuck Y. Mah
(74) Attorney, Agent, or Firm—Notaro & Michalos P.C.

(57) ABSTRACT

To create a torque difference in a tilting hinge, the tilting hinge includes a fixture consisting of a fixing plate portion to be fixed to the body of a portable computer and a bearing plate portion bent perpendicularly to the fixing plate portion; a rotating shaft consisting of a fixing portion to be fixed to a display screen of the portable computer, a large-diameter portion and a small-diameter portion, and born relatively rotatably in a bearing hole formed in the bearing plate portion of the fixture; a first friction washer having a through-hole formed in the center thereof and disposed between the large-diameter portion of the rotating shaft and one side of the bearing plate portion rotatably with the rotating shaft being inserted in the central through-hole or disposed in engagement with the bearing plate portion; a second friction washer having a through-hole formed in the center thereof and disposed fixed to the bearing plate portion with the rotating shaft being inserted at the small-diameter portion thereof in the central through-hole or rotatably with the rotating shaft; an elastic assembly of a spring washer or spring washers, a belleville spring or belleville springs, a wave washer or wave washers, etc. each having a through-hole formed in the center thereof, the assembly being disposed to abut on the second friction washer with the rotating shaft being inserted at the small-diameter portion thereon in the central through-hole; a set washer having a through-hole formed in the center thereof and disposed to abut on the elastic assembly rotatably with the rotating shaft being inserted at the small-diameter portion thereof in the central through-hole; the rotating shaft having a to-be-calked projection, from the set washer, of the small-diameter portion thereof; and a torque controlling means for generating, axially of the rotating shaft at either of the sides of the bearing plate portion, a torque varying depending upon the angle of rotation of the rotating shaft.

8 Claims, 19 Drawing Sheets

0° ~ 20° : 2 0 kgf · mm

20° ~ 180° : 4 0 kgf · mm

A=260° : 8 kgf · mm

B=100° : 40 kgf · mm

TILTING HINGE

BACKGROUND OF THE INVENTION

1. Field of the Invention

The present invention relates to a hinge used in an office-automation apparatus, and more particularly to a tilting hinge suitably usable to support, at a desired opened or closed angular position, a display screen of a portable computer such as a notebook or laptop computer.

2. Description of the Prior Art

A tilting hinge intended for use with a display screen of a portable computer as an office-automation apparatus and which uses only a friction mechanism to stably support the display screen at an intermediate opened angular position is already known from the disclosure in, for example, the Japanese Published Unexamined Patent Application No. Heisei 9 (1997)-62399. This conventional tilting hinge includes a fixture consisting of a fixing plate portion which is to be fixed to the body of a portable computer and a bearing plate portion bent perpendicularly to the fixing plate portion; a rotating shaft having a fixing portion born rotatably in a bearing hole formed in the bearing plate portion of the fixture and which is to be fixed to a display screen of the portable computer; a first friction washer having a through-hole formed in the center thereof and disposed between a large-diameter portion of the rotating shaft and one side of the bearing plate portion rotatably with the rotating shaft being inserted in the central through-hole or disposed in engagement with the bearing plate portion; a second friction washer having a non-circular through-hole formed in the center thereof and disposed to abut on the other side of the bearing plate portion rotatably with the rotating shaft being inserted at a non-round small-diameter portion thereof in the central non-circular through-hole; an elastic assembly of a spring washer or spring washers, a belleville spring or belleville springs, a wave washer or wave washers, etc. each having a through-hole formed in the center thereof, the assembly being disposed to abut on the second friction washer with the rotating shaft being inserted at the non-round small-diameter portion thereon in the central through-hole; and a set washer having a non-circular through-hole formed in the center thereof and disposed to abut on the elastic assembly rotatably with the rotating shaft being inserted at the non-round small-diameter portion thereof in the central through-hole; a projection, from the set washer, of the non-round small-diameter portion of the rotating shaft being calked so that a friction torque will develop between the first friction washer and the large-diameter portion of the rotating shaft or the bearing plate portion as well as between the second friction washer and the bearing plate portion or spring washer.

The above conventional tilting hinge is advantageous in that it has a simple structure and can support the display screen stably and securely at the intermediate opened angular position, and so it is adopted in many portable computers. With the conventional tilting hinge, however, the operating force required for stably supporting the display screen at the intermediate opened angular position is also required for supporting the display screen at other opened angular positions.

Also, since the friction torque is constant with the display screen supported at any angular positions of the display screen, a reactive force will remain in the conventional tilting hinge when the display screen is closed. To minimize the reactive force, the conventional tilting hinge has to include a locking mechanism provided between the display screen and the computer body.

OBJECTS AND SUMMARY OF THE INVENTION

Accordingly, the present invention has an object to overcome the above-mentioned drawbacks of the prior art by providing a tilting hinge adapted to allow to open or close, with a small operating force, a display screen at any angular positions other than an angular position at which the display screen can be stably supported, and eliminate the reactive force without any locking mechanism.

The above object can be attained by providing a tilting hinge, including according to the present invention, a fixture consisting of a fixing plate portion to be fixed to the body of a portable computer and a bearing plate portion bent perpendicularly to the fixing plate portion; a rotating shaft consisting of a fixing portion to be fixed to a display screen of the portable computer, a large-diameter portion and a small-diameter portion, and born relatively rotatably in a bearing hole formed in the bearing plate portion of the fixture; a first friction washer having a through-hole formed in the center thereof and disposed between the large-diameter portion of the rotating shaft and one side of the bearing plate portion rotatably with the rotating shaft being inserted in the central through-hole or disposed in engagement with the bearing plate portion; a second friction washer having a through-hole formed in the center thereof and disposed fixed to the bearing plate portion with the rotating shaft being inserted at the small-diameter portion thereof in the central through-hole or rotatably with the rotating shaft; an elastic assembly of a spring washer or spring washers, a belleville spring or belleville springs, a wave washer or wave washers, etc. each having a through-hole formed in the center thereof, the assembly being disposed to abut on the second friction washer with the rotating shaft being inserted at the small-diameter portion thereon in the central through-hole; a set washer having a through-hole formed in the center thereof and disposed to abut on the elastic assembly rotatably with the rotating shaft being inserted at the small-diameter portion thereof in the central through-hole; the rotating shaft having a to-be-calked projection, from the set washer, of the small-diameter portion thereof; and a torque controlling means for generating, axially of the rotating shaft at either of the sides of the bearing plate portion, a torque varying depending upon the angle of rotation of the rotating shaft.

In the above tilting hinge according to the present invention, the torque controlling means may be formed from a concavity or convexity formed on the second friction washer and a torque plate having formed thereon a convexity or concavity opposite to the concavity or convexity on the second friction washer, or it may be formed from a concavity or convexity formed on the first friction washer and a torque plate having formed thereon a convexity or concavity opposite to the concavity or convexity on the second friction washer.

Also in the above tilting hinge, when the torque plate is used, a spacer may be provided between the torque plate and bearing plate portion.

Also in the above tilting hinge, the torque controlling means may be formed from a convexity or concavity formed on the bearing plate portion and the first or second friction washer on which there are formed a convexity or concavity opposite to the convexity or concavity on the bearing plate portion.

Also in the above tilting hinge, when the concavity to abut on the convexity on the first or second friction washer is formed on the bearing plate portion, a space may be provided in which a convexity projecting to the opposite side to the concavity is received.

Also in the above tilting hinge, a set nut may be provided in place of the to-be-calked projection of the small-diameter portion of the rotating shaft and a lubricant may be applied between the first and second friction washers and members which are rotated in friction with the friction washers when the rotating shaft is rotated.

These objects and other objects, features, aspects and advantages of the present invention will become more apparent from the following detailed description of the present invention when taken in conjunction with the accompanying drawings.

DETAILED DESCRIPTION OF THE PREFERRED EMBODIMENTS

Figure 1:
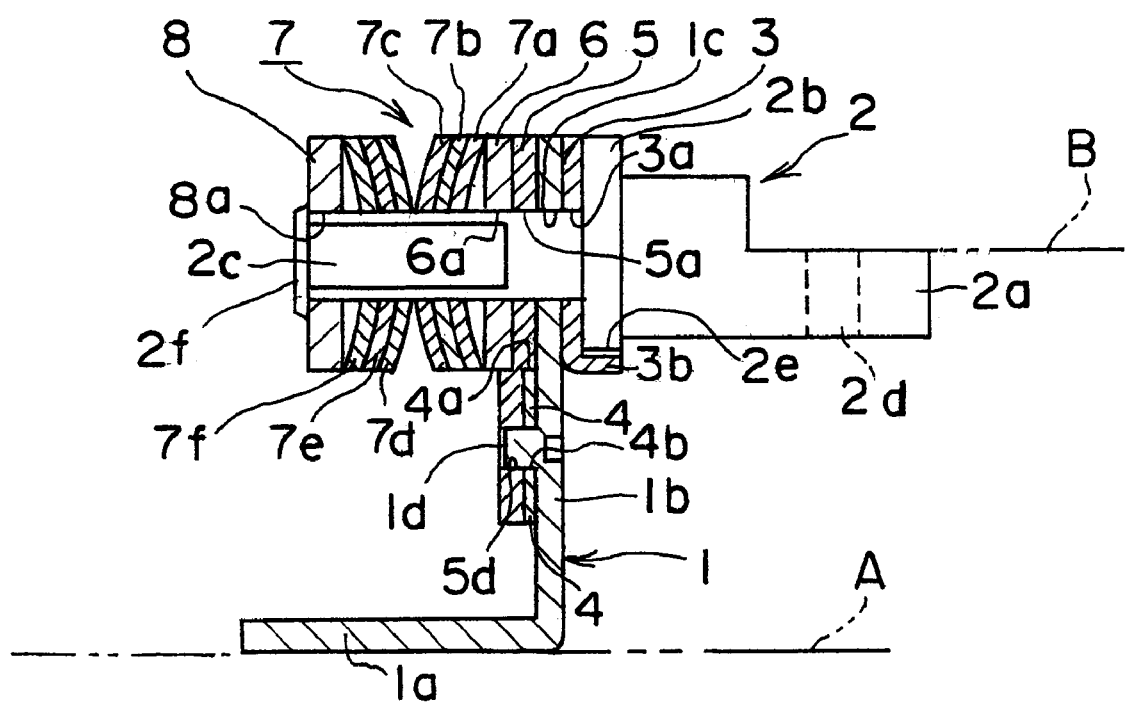
FIG. 1 is a front sectional view of a first embodiment of the tilting hinge according to the present invention.
Figure 2:
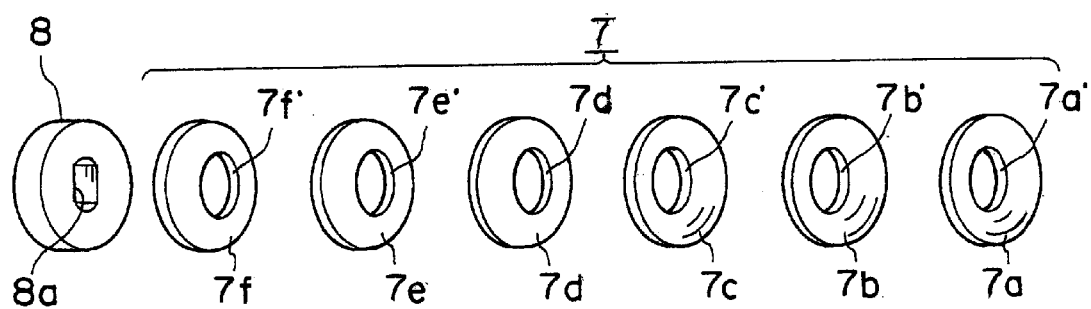
FIG. 2 is an exploded perspective view of the tilting hinge in FIG. 1.
Figure 2:
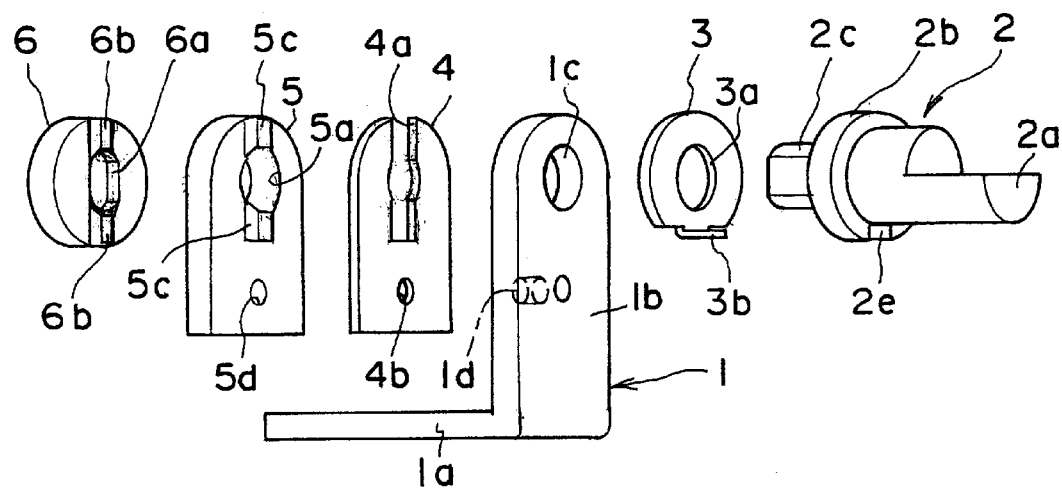

Referring now to FIGS. 1 to 5, there is illustrated the first embodiment of the tilting hinge according to the present invention. The tilting hinge includes a fixture for fixation to the body, indicated with a reference A, of a portable computer. The fixture is generally indicated with a reference 1. The fixture 1 is bent to have an L shape consisting of a fixing plate portion 1a and bearing plate portion 1b. However, the fixture 1 is not limited to this L shape. Basically, however, the bearing plate portion 1b should be perpendicular to the fixing plate portion 1a. The bearing plate portion 1b has a circular bearing hole 1c formed herein and a projecting dowel or pin 1d provided below the hole 1c.

Figure 3:
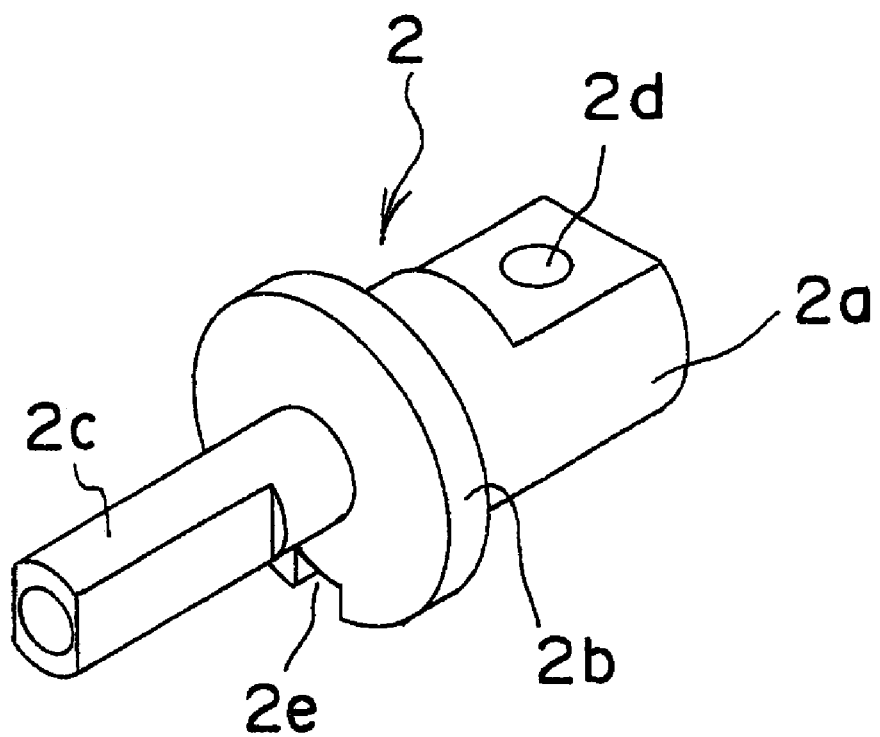
FIG. 3 is a perspective view of the rotating shaft of the tilting hinge, in a different direction from that in FIGS. 1 and 2.

As best seen from FIGS. 1 and 3, the tilting hinge further includes a rotating shaft generally indicated with a reference 2. The rotating shaft 2 consists, axially thereof, of a fixing portion 2a, large-diameter portion 2b and a non-round small-diameter portion 2c having a generally oval cross section. The fixing portion 2a is formed to have a semi-circular cross section and have a fixing hole 2d formed therein. The large-diameter portion 2b has an engagement cut 2e formed in the outer edge thereof. As best seen from FIG. 1, the rotating shaft 2 is born at the small-diameter portion 2c thereof rotatably in the bearing hole 1c formed in the bearing plate portion 1b of the fixture 1. Note that the non-round small-diameter portion 2c may be formed to have a circular cross section.

Further the tilting hinge includes a first friction washer generally indicated with a reference 3. The first friction washer 3 has a circular through-hole 3a formed in the center thereof and an engagement lug 3b. It is disposed between the large-diameter portion 2b of the rotating shaft and the bearing plate portion 1b with the non-round small-diameter portion 2c of the rotating shaft being inserted through the central through-hole 3a and the engagement lug 3b provided on the outer edge of the first friction washer 3 being engaged in the engagement cut 2e formed in the large-diameter portion 2b of the rotating shaft 2. Thus, the first friction washer 3 is rotatable with the rotating shaft 2. Note that the first friction washer 3 may have the through-hole 3a formed to have the same shape as the non-round small-diameter portion 2c of the rotating shaft so as to be rotatable with the rotating shaft even with the engagement lug 3b being not engaged in the engagement cut 2e, and that the first friction washer 3 is engaged on the bearing plate portion 1b as the case may be.

The tilting hinge further includes a space 4. The space 4 has a cut 4a and engagement hole 4b formed therein. It is disposed to abut on one side of the bearing plate portion 1b with the rotating shaft 2 being inserted at the small-diameter portion 2c thereof in a circular portion of the cut 4a while the dowel or pin 1d being fitted in the engagement hole 4b. Thus the space 4 is integral with the bearing plate portion 1b.

Further the tilting hinge includes a torque plate 5. The torque plate 5 has a circular through-hole 5a, convexities 5b, concavities 5c and an engagement hole 5d. As best seen from FIG. 1, the torque plate 5 is disposed to abut at one side thereof on the space 4 with the rotating shaft 2 being inserted at the non-round small-diameter portion 2c thereof in the circular through-hole 5a. As best seen from FIGS. 2 and 4, the concavities 5b are provided opposite to each other across the through-hole 5a. By working the torque plate 5 by pressing to form the concavities 5c, the convexities 5b are formed on the opposite side of the torque plate 5 to the concavities 5c as shown. Thus, the convexities 5b are fitted in the cut 4a in the spacer 4 and the dowel or pin 1d formed on the bearing plate portion 1b is fitted in the engagement hole 5d formed in the torque plate 5 below the through-hole 5a.

The spacer 4 and torque plate 5 are fixed to the bearing plate portion 1b with the dowel or pin 1d fitted in the engagement holes 4b and 5d. However, it should be noted that the spacer 4 and torque plate 5 may be fixed to the bearing plate portion 1b with them placed to abut at their lower ends on the fixing plate portion 1a. Further, note that, the spacer 4 is not required in case the convexities 5b are not formed on the opposite side to the concavities 5c when the concavities 5c are formed in the torque plates 5.

Further the tilting hinge includes a second friction washer 6. As best seen from FIGS. 2 and 4, the second friction washer 6 has a non-circular (generally oval) through-hole 6a formed in the center thereof and convexities 6b formed opposite to each other across the through-hole 6a. The convexities 6b are to be fitted into the concavities 5d in the torque plate 5 when the rotating shaft 2 is rotated to a predetermined angular position. The second friction washer 6 is disposed to abut at one side thereof on the torque plate 5 with the rotating shaft 2 being inserted at the non-round small-diameter portion 2c thereof in the non-circular through-hole 6a, and thus the second friction washer 6 is rotatable with the rotating shaft 2.

The tilting hinge also includes an elastic assembly 7 of six belleville springs 7a to 7f having circular through-holes 7a' to 7f' formed in the center thereof. The elastic assembly is disposed to abut at one side thereof on the second friction washer 6. Of the belleville springs 7a to 7f, three are oriented in the same direction while the other three are oriented in a direction opposite to the direction of the former three. The rotating shaft 2 is inserted at the non-round small-diameter portion 2c thereof through the circular through-holes 7a' to 7f' in the belleville springs 7a to 7f.

The tilting hinge further includes a set washer 8 having a non-circular (generally oval) through-hole 8a formed in the center thereof. The set washer 8 is disposed to abut on the other side of the elastic assembly 7 opposite to the side on which the second friction washer 6 abuts. The rotating shaft 2 is inserted at the non-round small-diameter portion 2c thereof in the non-circular through-hole 8a of the set washer 8 which will thus be rotatable with the rotating shaft 2.

After having assembled together the aforementioned components of the tilting hinge as in the above, a projection, from the set washer 8, of the small-diameter portion 2c of the rotating shaft 2 is calked to form a rivet 2f, so that the first and second friction washers 3 and 6 will be pressed to the bearing plate portion 2b and torque plate 5, respectively. As the rotating shaft 2 is rotated, a friction torque will develop between the first friction washer 3 and bearing plate portion 2b as well as between the second friction washer 6 and torque plate 5.

Note that in addition to the aforementioned embodiment, the first friction washer 3 is disposed in engagement on the bearing plate portion 1b to develop a friction torque between the first friction washer 3 and large-diameter portion 2b of the rotating shaft 2 or the first friction washer 3 may not be disposed in engagement on either of the large-diameter portion 2b or bearing plate portion 1b so that a friction torque will develop in a place not predetermined.

Further, when a concavity is formed in the bearing plate portion 1b, the torque plate 5 and spacer 4 may be omitted. The concavity may be a recess or hole. A lubricant is applied to a place where a friction washer will develop. It should be noted that the bearing plate portion 1b, first friction washer 3, torque plate 5 and second friction washer 6 may have formed in one side thereof a concavity or concavities or a hole or holes where the lubricant will stay.

While the convexities 6b of the second friction washer 6 rotated with the rotating shaft 2 are staying in the concavities 5c, respectively, in the torque plate 5 after the rotating shaft 2 has been rotated through a predetermined angle, the friction torque of the rotating shaft 2 will be lower. However, in an angular range of 20 to 80 deg. in which the convexities 6b of the second friction washer 6 have moved beyond the concavities 5b of the torque plate 5 as the rotating shaft 2 is rotated, a high friction torque will be created.

Figure 4:
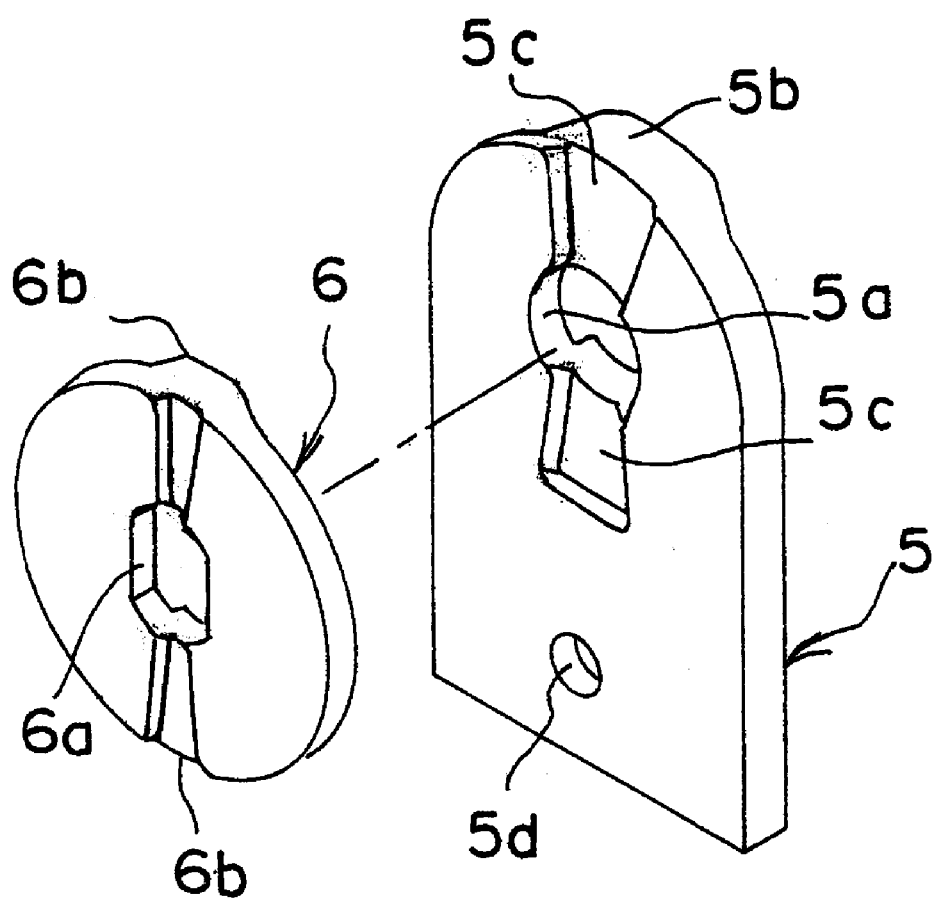
FIG. 4 is a perspective view of the second friction washer and torque plate of the tilting hinge, in a different direction from that in FIGS. 1 and 2.
Figure 5:
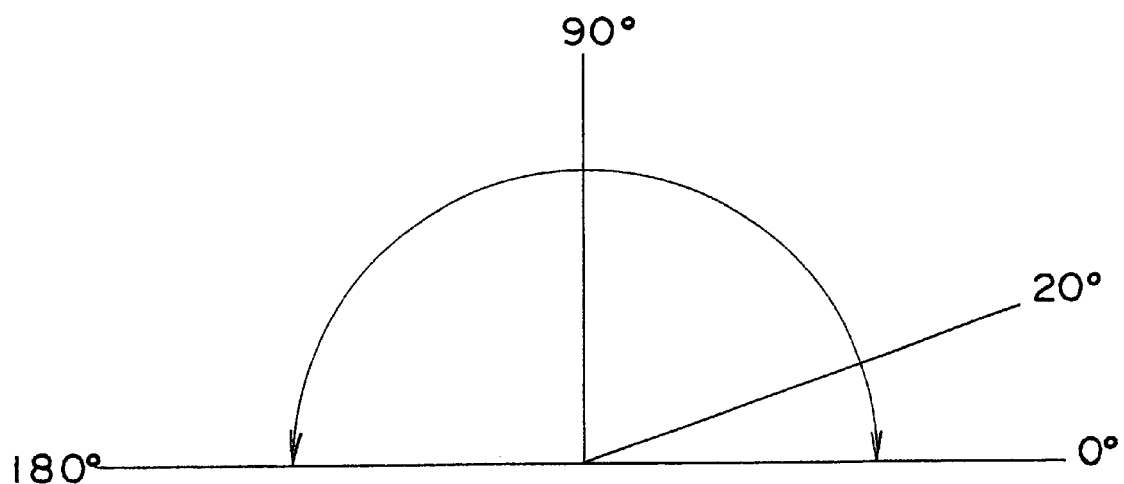
FIG. 5 is an explanatory drawing of the operation of the tilting hinge shown in FIGS. 1 and 2.
Figure 6:
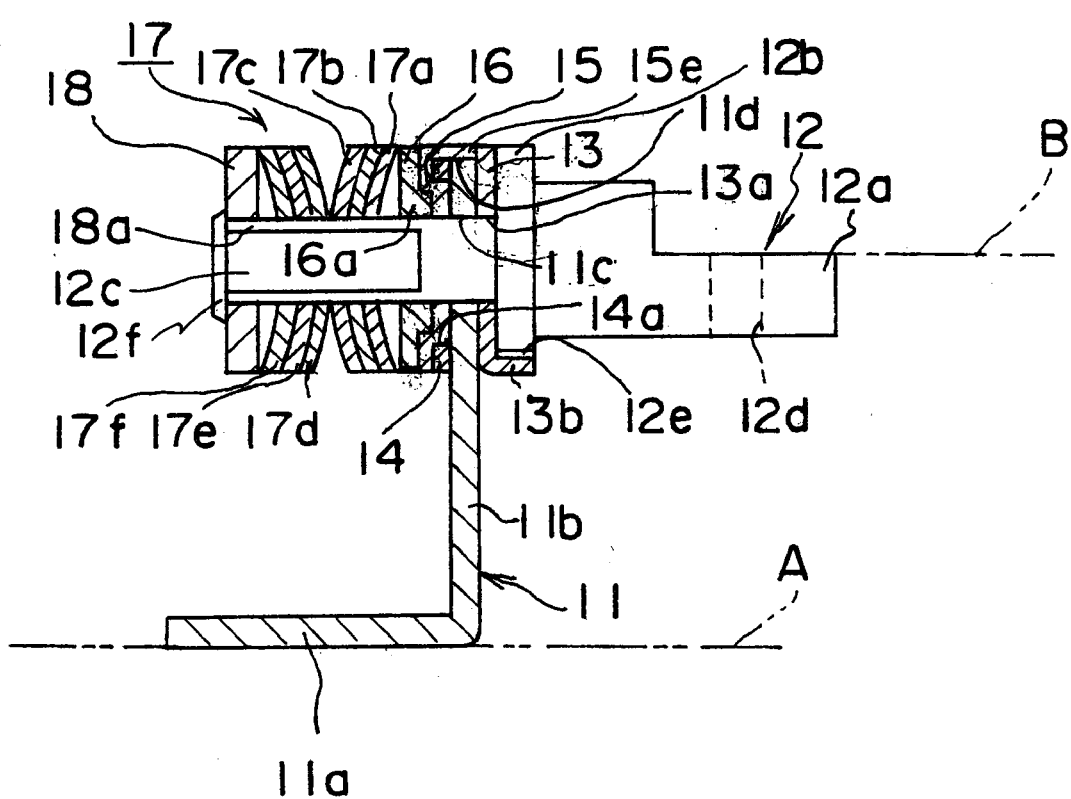
FIG. 6 is a front sectional view of a second embodiment of the tilting hinge according to the present invention.

With the convexities 6b of second friction washer 6 and concavities 5c of the torque plate 5 being disposed as having been described and illustrated, a display screen, indicated with a reference B, of the portable computer, fixed to the fixing portion 2a of the rotating shaft 2 will be opened and closed with a low rotation moment (20 kgf·mm in this first embodiment) when the angle of rotation is 0 to 20 deg. and with a high rotation moment (40 kgf·mm in the first embodiment) when the angle of rotation is 20 to 180 deg. as will be best seen from FIG. 4.

Referring now to FIGS. 6 to 12, there is illustrated the second embodiment of the tilting hinge according to the present invention. The tilting hinge includes a fixture for fixation to the body, indicated with a reference A, of a portable computer. The fixture is generally indicated with a reference 11. The fixture 11 is bent to have an L shape consisting of a fixing plate portion 11a and bearing plate portion 11b. However, the fixture 11 is not limited to this L shape. Basically, however, the bearing plate portion 11b should be perpendicular to the fixing plate portion 11a. The bearing plate portion 11b has a circular bearing hole 11c formed therein and a cut 11d formed in the top thereof.

Figure 7:
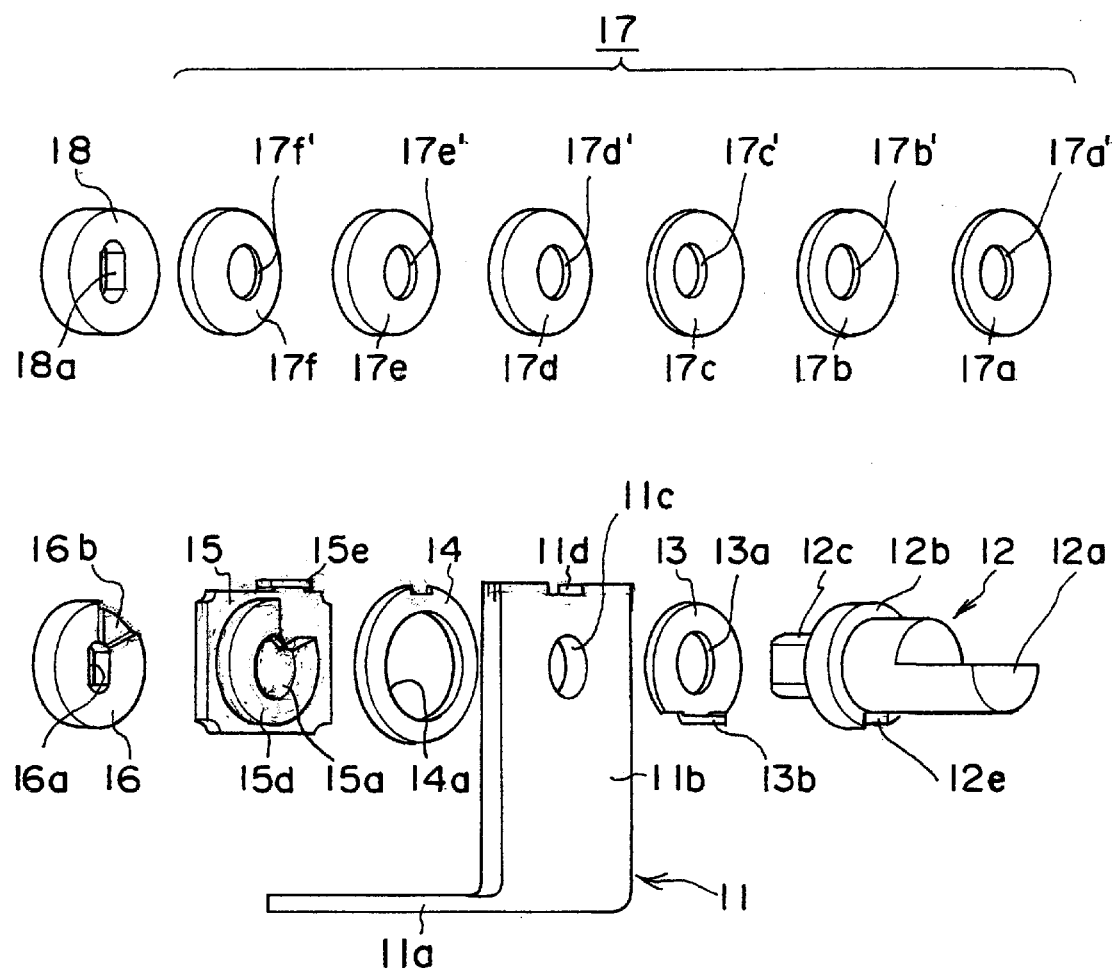
FIG. 7 is an exploded perspective view of the tilting hinge in FIG. 6.
Figure 8:
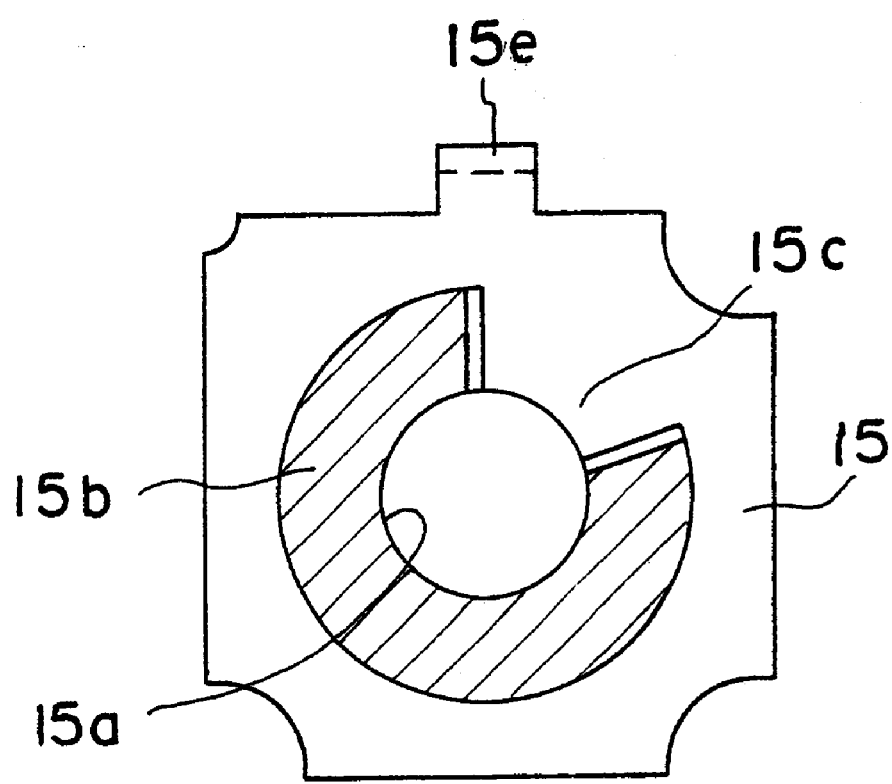
FIG. 8 is a left side elevation of the torque plate of the tilting hinge in FIGS. 6 and 7.
Figure 9:
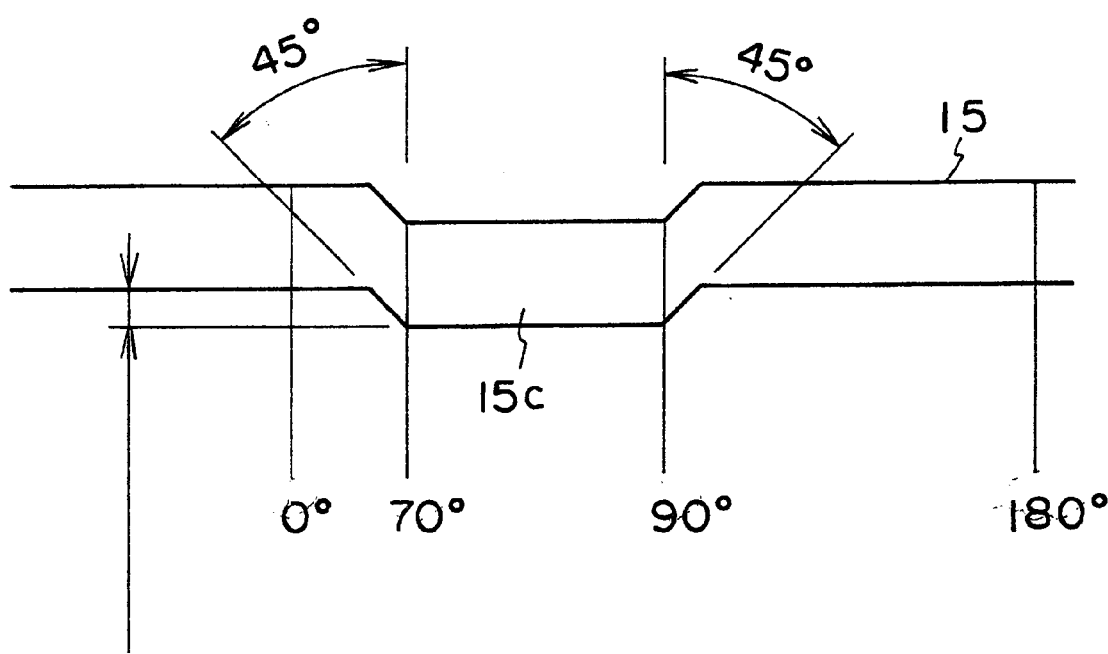
FIG. 9 is an explanatory drawing, enlarged in scale, of the concave portion of the torque plate of the tilting hinge shown in FIG. 8.
Figure 10:
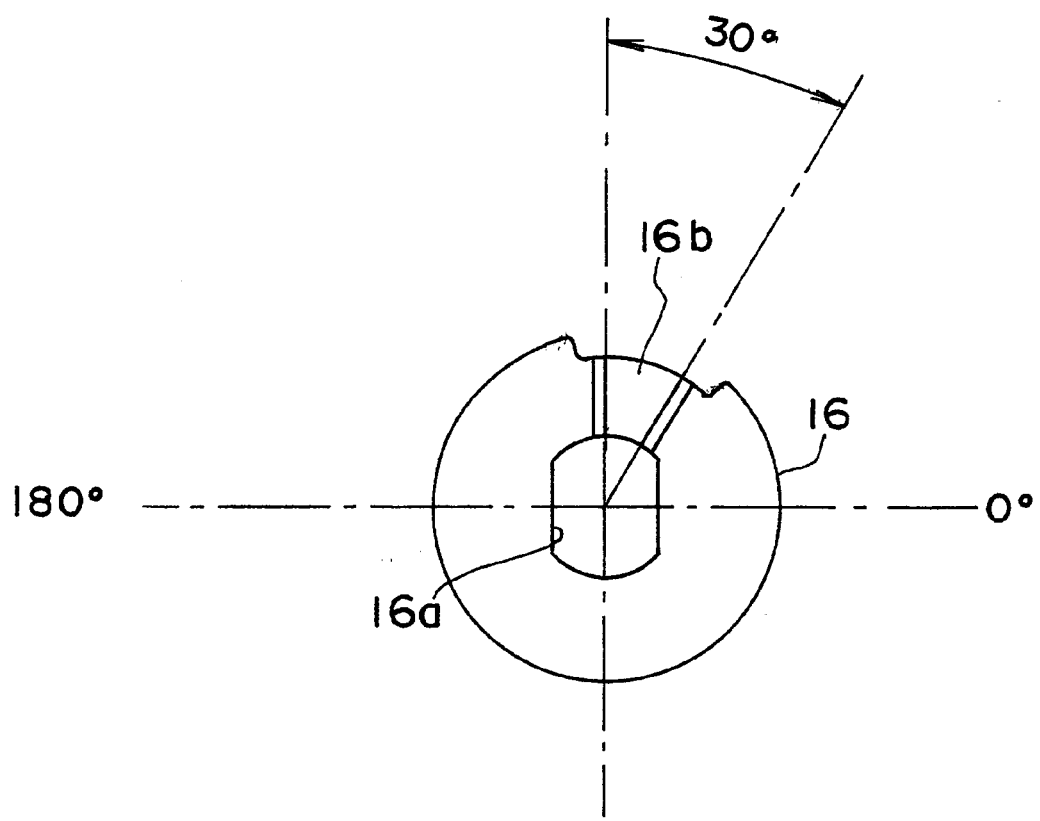
FIG. 10 is a plan view of the second friction washer of the tilting hinge in FIGS. 6 and 7.
Figure 11:
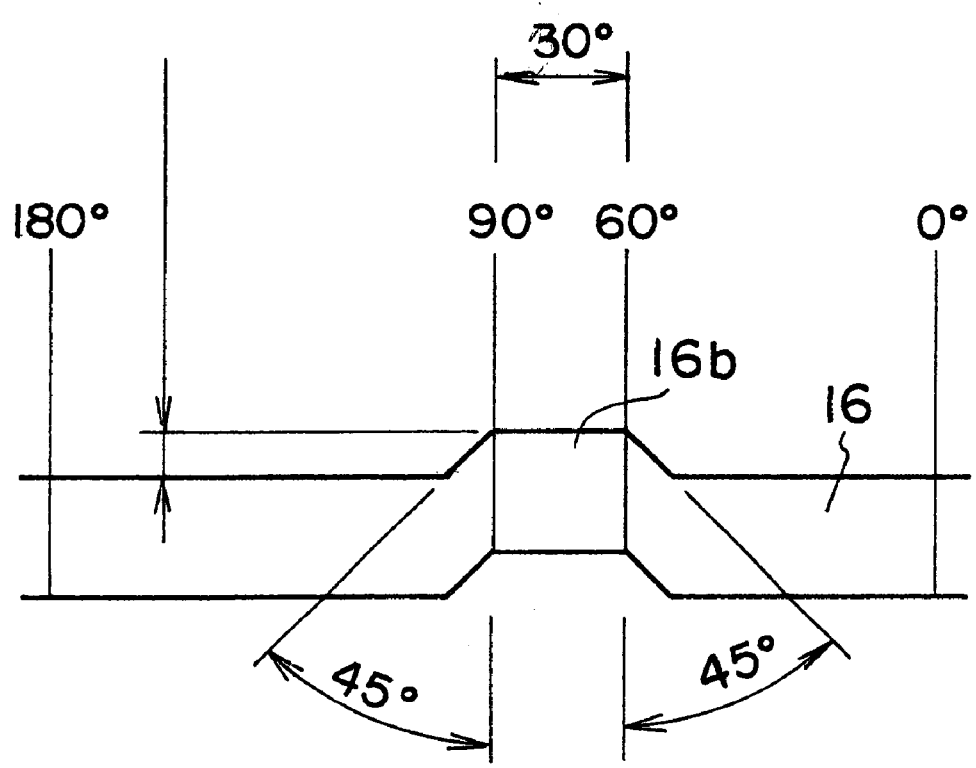
FIG. 11 is an explanatory drawing, enlarged in scale, of the convex portion of the second friction washer in FIG. 10.

As best seen from FIG. 7, the tilting hinge further includes a rotating shaft generally indicated with a reference 12. The rotating shaft 12 consists, axially thereof, of a fixing portion 12a, large-diameter portion 12b and a non-round small-diameter portion 12c having a generally oval cross section. The fixing portion 12a is formed to have a semi-circular cross section and have a fixing hole 12d formed therein. The large-diameter portion 12b has an engagement cut 12e formed in the outer edge thereof. The rotating shaft 12 is born at the small-diameter portion 12c thereof rotatably in the bearing hole 11c formed in the bearing plate portion 11b of the fixture 11.

Further the tilting hinge includes a first friction washer generally indicated with a reference 13. The first friction washer 13 has a circular through-hole 13a formed in the center thereof and an engagement lug 13b. It is disposed between the large-diameter portion 12b of the rotating shaft 12 and the bearing plate portion 11b with the non-round small-diameter portion 12c of the rotating shaft being inserted through the central through-hole 13a and the engagement lug 13b provided on the outer edge of the first friction washer 13 being engaged in the engagement cut 12e formed in the large-diameter portion 12b of the rotating shaft 12. Thus, the first friction washer 13 is rotatable with the rotating shaft 12. Note that the first friction washer 13 may have the through-hole 13a formed to have the same shape as the non-round small-diameter portion 12c of the rotating shaft so as to be rotatable with the rotating shaft even with the engagement lug 13b being not engaged in the engagement cut 12e and that the first friction washer 13 is engaged on the bearing plate portion 11b as the case may be.

The tilting hinge further includes a space 14. The space 14 has a through-hole 14a formed in the center thereof. It is disposed to abut on one side of the bearing plate portion 11b with the rotating shaft 12 being inserted at the small-diameter portion 12c thereof through the through-hole 14a in which a convexity 15b of a torque plate 15 which will further be described later is also fitted.

Further the tilting hinge includes a torque plate 15. The torque plate 15 has a circular through-hole 15a in the center thereof. It is disposed to abut at one side thereof on the spacer 14 with the rotating shaft 12 being inserted at the small-diameter portion 12c thereof in the through-hole 15a. As best seen from FIGS. 8 to 10, the torque plate 15 has a generally C-shaped convexity 15b formed thereon by pressing. The C-shaped concavity is contiguous to a convexity 15c. Forming the concavity 15b by pressing results in the convexity 15d projecting to the opposite side of the torque plate 15 to the concavity 15b. The convexity 15d is fitted into the through-hole 14a in the spacer 14 while an engagement lug 15e formed atop the torque plate 15 is fitted and engaged in the, engagement cut 11d atop the bearing plate portion 11b.

The torque plate 15 is fixed to the bearing plate portion 11b with the engagement lug 15e fitted in the engagement cut 11d. However, it should be noted that the torque plate 15 may be fixed to the bearing plate portion 11b with the lowed end thereof disposed to abut on the fixing plate portion 11a. Further, note that the spacer 14 is not required in case no convexity 15d is formed on the opposite side to the concavity 15b when the latter is formed in the torque plates 15.

Further the tilting hinge includes a second friction washer 16. As best seen from FIGS. 7 and 10 to 11, the second friction washer 16 has a non-circular (generally oval) through-hole 16a formed in the center thereof and a convexity 16b formed thereon. The second friction washer 16 is disposed to abut at one side thereof on the torque plate 15 with the rotating shaft 12 being inserted and engaged at the non-round small-diameter portion 12c thereof in the non-circular through-hole 16a, and thus the second friction washer 16 is rotatable with the rotating shaft 12. Also, the convexity 16b is put into contact with the concavity 15b or convexity 15c of the torque plate 15 when the rotating shaft 12 is rotated to a predetermined angle.

The tilting hinge also includes an elastic assembly 17 of six belleville springs 17a to 17f having circular through-holes 17a' to 17f' formed in the center thereof. The elastic assembly is disposed to abut at one side thereof on the second friction washer 16. Of the belleville springs 17a to 17f, three are oriented in the same direction while the other three are oriented in a direction opposite to the direction of the former three. The rotating shaft 12 is inserted at the non-round small-diameter portion 12c thereof through the circular through-holes 17a' to 17f' in the belleville springs 17a to 17f.

The tilting hinge further includes a set washer 18 having a non-circular (generally oval) through-hole 18a formed in the center thereof. The set washer 18 is disposed to abut on the other side of the elastic assembly 17 opposite to the side on which the second friction washer 16 abuts. The rotating shaft 12 is inserted at the non-round small-diameter portion 12c thereof in the non-circular through-hole 18a of the set washer 18 which will thus be rotatable with the rotating shaft 12.

After having assembled together the aforementioned components of the tilting hinge as in the above, a projection, from the set washer 18, of the small-diameter portion 12c of the rotating shaft 12 is calked to form a rivet 12f, so that the first and second friction washers 13 and 16 will be pressed to the bearing plate portion 12b and torque plate 15, respectively. As the rotating shaft 12 is rotated, a friction torque will develop between the first friction washer 13 and bearing plate portion 12b as well as between the second friction washer 16 and torque plate 15.

Note that in addition to the aforementioned embodiment, the first friction washer 13 is disposed in engagement on the bearing plate portion 11b to develop a friction torque between the first friction washer 13 and large-diameter portion 12b of the rotating shaft 12 or the first friction washer 13 may not be disposed in engagement on either of the large-diameter portion 12b or bearing plate portion 11b so that a friction torque will develop in a place not predetermined.

Further, when a concavity and convexity are formed in the bearing plate portion 11b, any of the torque plate 15 and spacer 14 may be omitted. The concavity may be a recess or hole. A lubricant is applied to a place where a friction washer will develop. Note that the bearing plate portion 11b, first friction washer 13, torque plate 15 and second friction washer 16 may have formed in one side thereof a concavity or concavities or a hole or holes where the lubricant will stay.

While the convexity 16b of the second friction washer 16 rotated with the rotating shaft 12 is staying in the concavity 15b in the torque plate 15 after the rotating shaft 12 has been rotated through a predetermined angle, the friction torque of the rotating shaft 12 will be lower. However, in a range of angular position in which the convexity 16b of the second friction washer 16 has moved beyond the concavity 15b of the torque plate 15 and gets into contact with the convexity 15c as the rotating shaft 12 is rotated, a high friction torque will be created.

Figure 12:
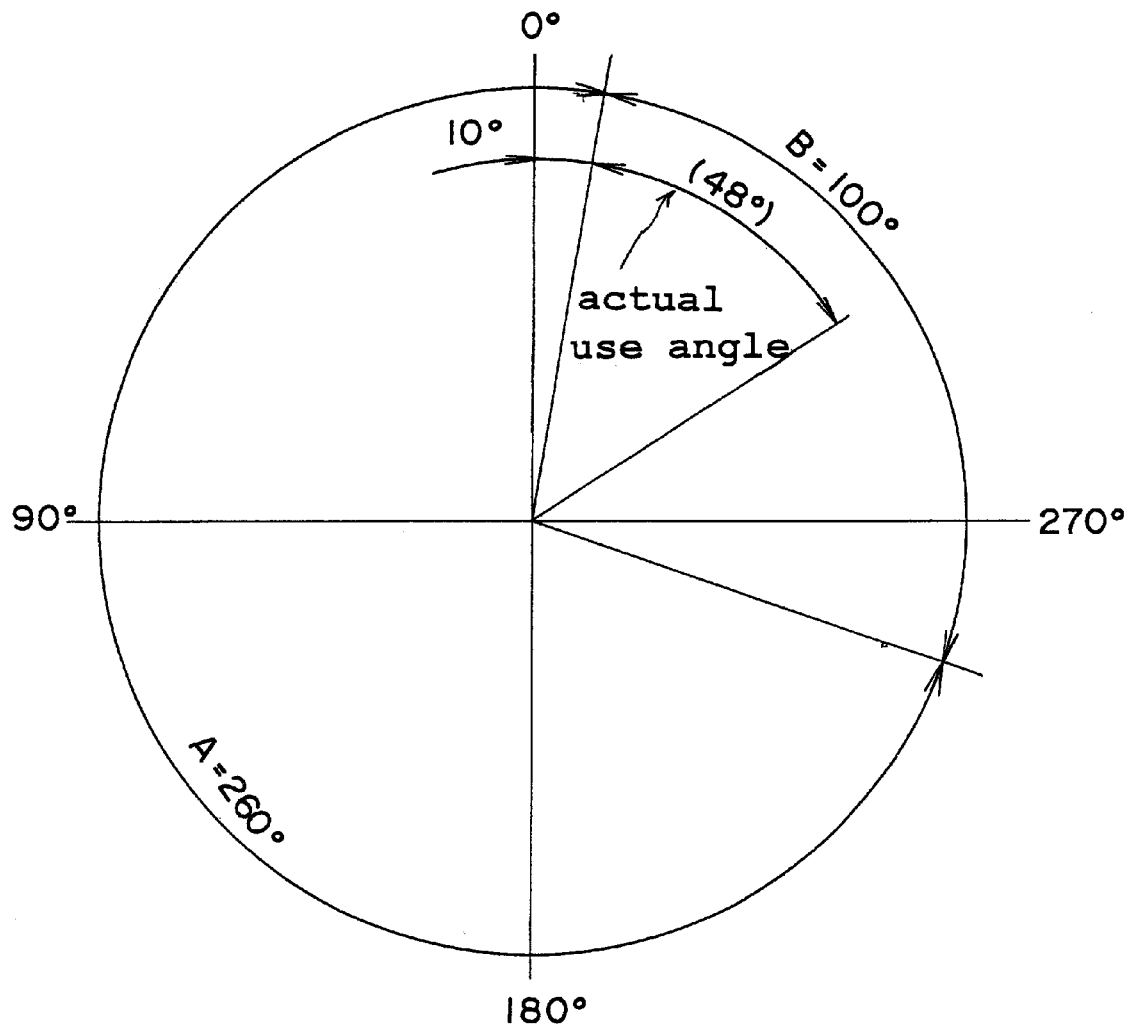
FIG. 12 is an explanatory drawing of the operation of the tilting hinge shown in FIGS. 6 and 7.
Figure 13:
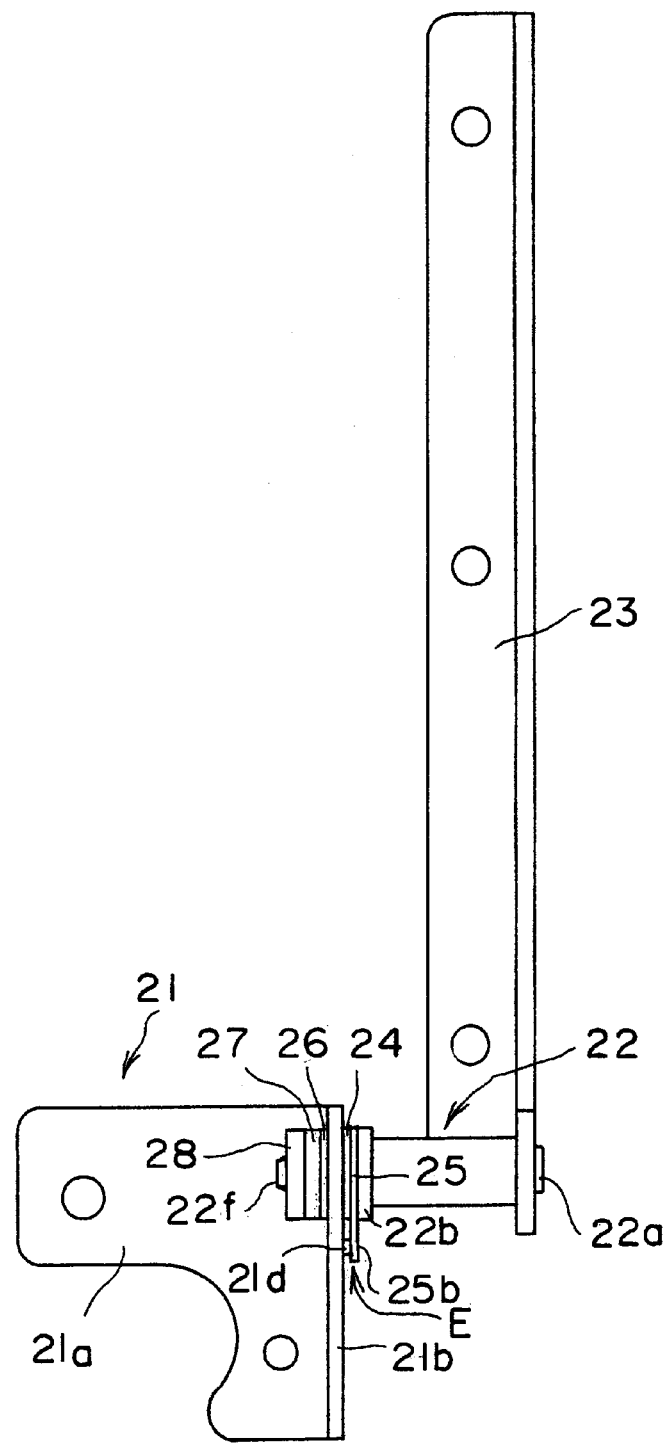
FIG. 13 is a plan view of a third embodiment of the tilting hinge according to the present invention.
Figure 14:
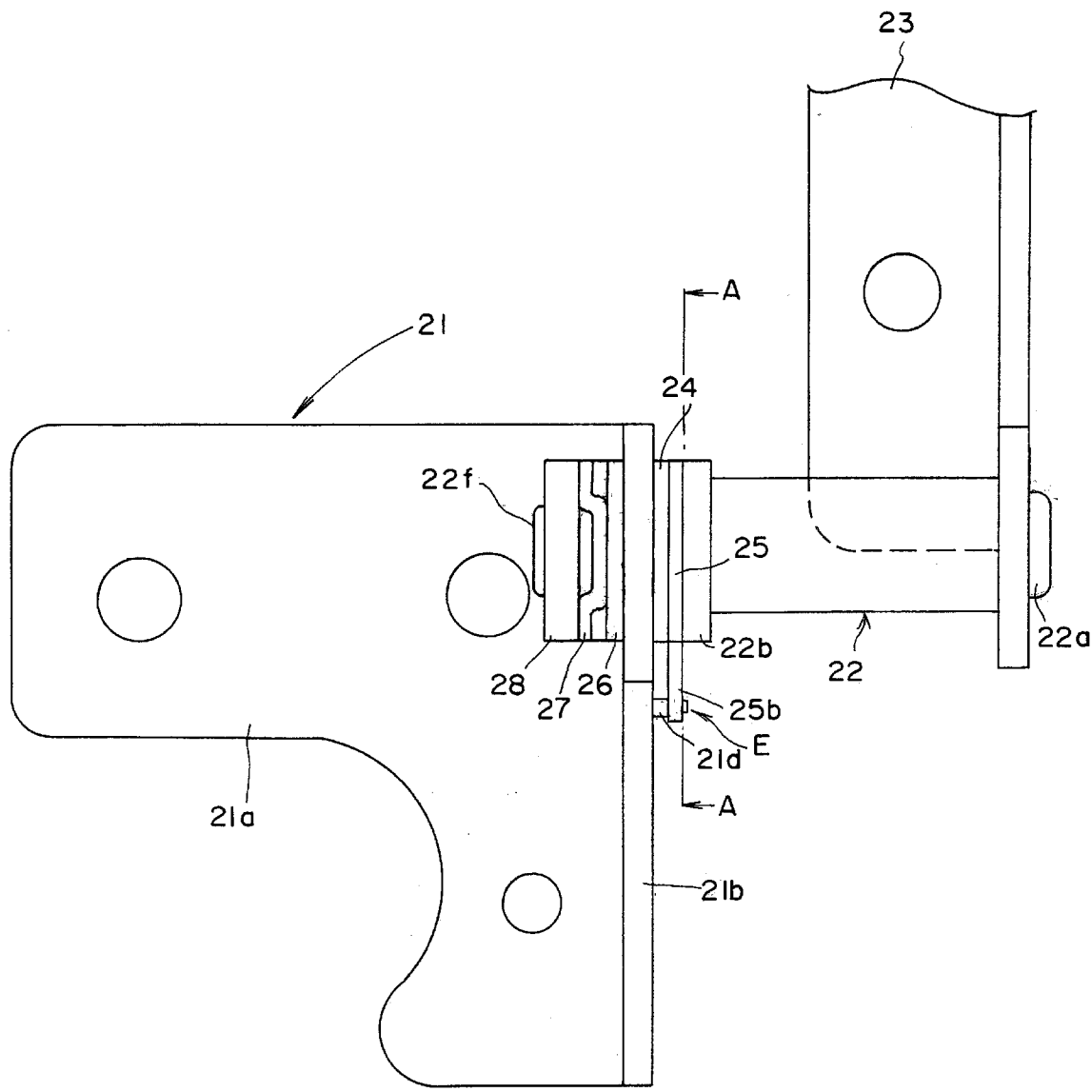
FIG. 14 is a plan view, partially enlarged in scale, of the tilting hinge shown in FIG. 13.

With the convexity 16b of second friction washer 16 and concavity 15b of the torque plate 15 being disposed as having been described and illustrated, a display screen, indicated with a reference B, of the portable computer, fixed to the fixing portion 12a of the rotating shaft 12 will be opened and closed with a high rotation moment (40 kgf mm in this second embodiment) when the angle of rotation is up to 100 deg. and with a low rotation moment (8 kgf·mm in the second embodiment) when the angle of rotation is up to 260 deg. as will be best seen from FIG. 12. The display screen B is actually supported for use at an angle of 48 deg. included in the angular range of up to 100 deg.

In both the above two embodiments of the tilting hinge according to the present invention, the torque plate may be provided at the side of the first friction washer to develop, between the torque plate and first friction washer, a friction torque which depends on the angle of rotation of the rotating shaft. In this case, the first friction washer and torque plate may have the same shape and construction as those in these embodiments. Also, the spacer, if necessary, may be a one used in the embodiments. When the torque plate is fixed to the bearing plate portion, the first friction washer will be bound by the rotating shaft. When the torque plate is bound by the rotating shaft, the first friction washer will be fixed to the bearing plate portion.

Referring now to FIGS. 13 to 18, there is illustrated the third embodiment of the tilting hinge according to the present invention. This tilting hinge includes a fixture to be fixed to the body, indicated with a reference C, of a portable computer. The fixture is generally indicated with a reference 21, and consists of a fixing plate portion 21a and a bearing plate portion 21b, which are bent perpendicularly to each other. Thus, the fixture 21 has a generally L shape which however is just a non-limitative example. Basically, however, the bearing plate portion 21b is perpendicular to the fixing plate portion 21a. The bearing plate portion 21b has a circular bearing hole 21c formed therein, and a projection 21d like a dowel or pin and an engagement hole 21e provided around the bearing hole 21c.

The tilting hinge also includes a rotating shaft 22 consisting, axially thereof, of a fixing portion 22a, large-diameter portion 22b, non-round middle-diameter portion 22c having a generally oval cross section, and a long non-round small-diameter portion 22d. The fixing portion 22a is flattened, by cutting or otherwise, on side thereof. A support member 23 to support a display screen indicated with a reference D is fitted on the fixing portion 22a. The rotating shaft 22 is born at the non-round small-diameter portion 22d thereon in the bearing hole 21c formed in the bearing plate portion 21b of the fixture 21.

Also the tilting hinge includes a first friction washer 24 having a non-circular (generally oval) through-hole 24a formed in the center thereof. The first friction washer 24 is disposed between the large-diameter portion 22b of the rotating shaft 22 and the bearing plate portion 21b with the rotating shaft 22 being inserted and engaged at the non-round small-diameter portion 22d thereof in the non-circular through-hole 24a, and thus the first friction washer 24 is rotatable with the rotating shaft 22. Note that the through-hole 24a in the first friction washer 24 may be formed circular and an engagement lug formed on the outer edge of the first friction washer 24 may be engaged in an engagement cut formed in the large-diameter portion 22b of the rotating shaft 22 or in an engagement cut or hole formed in the bearing plate portion 21b so that the first friction washer 24 is rotatable or not with the rotating shaft 22.

The tilting hinge also includes a torque plate 25 formed to have a general profile of a tadpole. The torque plate 25 has a non-circular (generally oval) through-hole 25a formed therein. The rotating shaft 22 is inserted and engaged at the non-round middle-diameter portion 22c thereof in the non-circular through-hole 25a. The torque plate 25 has a tail portion 25b having formed therein a cut 25c into which the projection 21d like a dowel or pin provided on the bearing plate portion 25c enters when the rotating shaft 22 is rotated to a predetermined angular position. Thus, a suction mechanism E is formed. In the suction mechanism E, the cut 25c formed in the torque plate 25 may be a concavity or hole and there may be in the torque plate 25 a convexity which will enter a concavity or hole formed in the bearing plate portion 21b. Further, the dowel or pin or the concavity or hole form on the bearing plate portion 21b may be omitted and provided instead on the fixing plate portion 21a. Also, the engagement lug provided on the edge of the torque plate 25 may be engaged in the engagement cut or hole formed in the large-diameter portion 22b of the rotating shaft 22 so that the torque plate 25 will be rotatable with the rotating shaft 22.

The titling hinge further includes a second friction washer 26 having a circular through-hole 26a formed in the center thereof and an engagement lug 26b formed to project from the outer circumference thereof. The second friction washer 26 is disposed to abut one side thereof on the other side of the bearing plate portion 21b with the rotating shaft 22 being inserted at the non-round small-diameter portion 22d thereof in the circular through-hole 26a and the engagement lug 26b being engaged in the engagement hole 21e in the bearing plate portion 21b. Note that the second friction washer 26 may be designed to be rotatable with the rotating shaft 22 so that a friction torque will develop between the second friction washer 26 and bearing plate portion 21b.

Further the tilting hinge includes an elastic member 27 consisting of a spring washer. The elastic member 27 has a non-circular (generally oval) through-hole 27a formed in the center thereof. The elastic member 27 is disposed to abut on the second friction washer 26 with the rotating shaft 22 being inserted at the non-round small-diameter portion 22d thereof in the circular through-hole 28a. Note that more than one piece of the elastic member 27 may be provided or the elastic member 27 may be formed from a wave washer, belleville spring or a compression spring.

The tilting hinge further includes a set washer 28 having a non-circular (generally oval) through-hole 28a formed therein. The set washer is disposed to abut on the elastic member 27 with the rotating shaft 22 being inserted and engaged at the non-round small-diameter portion 22d thereof in the non-round through-hole 28a, so that it will be rotatable with the rotating shaft 22.

After having assembled the tilting hinge as in the above, the projection, from the set washer 28, of the non-round small-diameter portion 22d of the rotating shaft 22 is calked to form a rivet 22f. Thus, the first and second friction washers 24 and 26 are pressed to the bearing plate portion 21b and elastic member 27, respectively. As the rotating shaft 22 is rotated, a friction torque will develop between the first friction washer 24 and bearing plate portion 21b as well as between the second friction washer 26 and elastic member 27.

Note that apart from the aforementioned third embodiment, the first friction washer 24 may be engaged on the bearing plate portion 21b so that a friction torque will develop between the first friction washer 24 and the large-diameter portion 22b of the rotating shaft 22 or the torque plate 25, and that the first friction washer 24 may not be engaged on either the large-diameter portion 22b of the rotating shaft 22 or the bearing plate portion 21b so that a friction torque will develop in a place not predetermined. Furthermore, in case a compression spring is used as the elastic member 27, the second friction washer 26 may be disposed to be rotatable with the rotating shaft 22 for a friction torque to develop between the second friction washer 26 and bearing plate portion 21b. This construction may also be applied when the elastic member 27 is formed from a spring washer, belleville spring or wave washer.

Furthermore, the torque plate 25 may be provided at the second friction washer 26 or it may be provided to work at the first and second friction washers 24 and 26.

Moreover, a lubricant is applied to portions of the first and second friction washers 24 and 26 where a friction torque will develop. In this case, the first and second friction washers 24 and 26 may have formed in such portions a concavity or concavities or a hole or holes in which the lubricant will stay.

Therefore, when the display screen D closed to the body C of the portable computer is opened, the rotating shaft 22 will be rotated via the support member 24 while the projection 21d of the bearing plate portion 21b escapes from the cut 25c in the torque plate 25 rotating with the rotating shaft 22, Thereafter, a friction torque will develop between the first friction washer 24 rotating with the rotating shaft 22 and the bearing plate portion 21b as well as between the elastic member 27 rotating with the rotating shaft 22 and the second friction washer 26, so that the display screen D will be stopped and sustained at a desired opened angular position in a free-stop manner.

Figure 15:
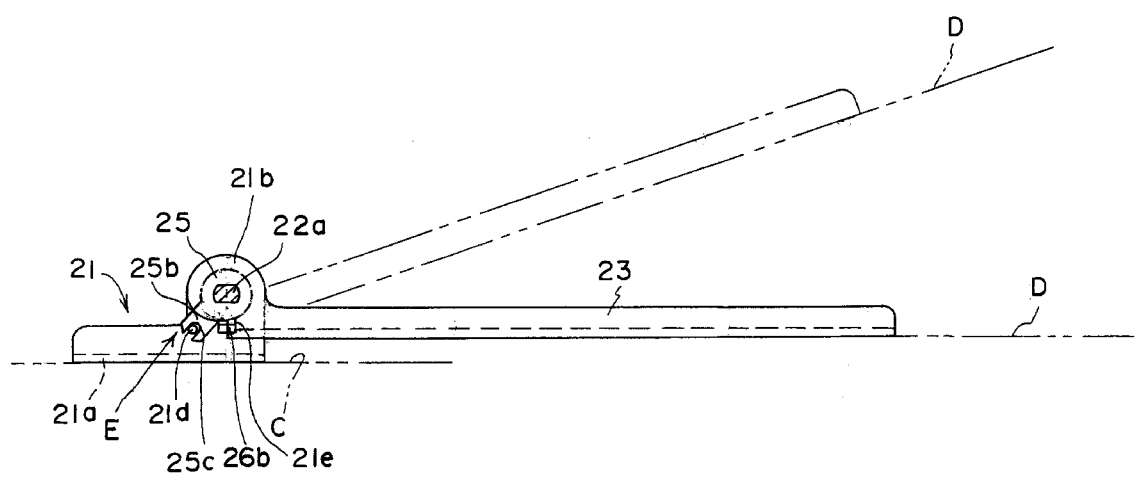
FIG. 15 is a side elevation of the tilting hinge shown in FIG. 13.
Figure 16:
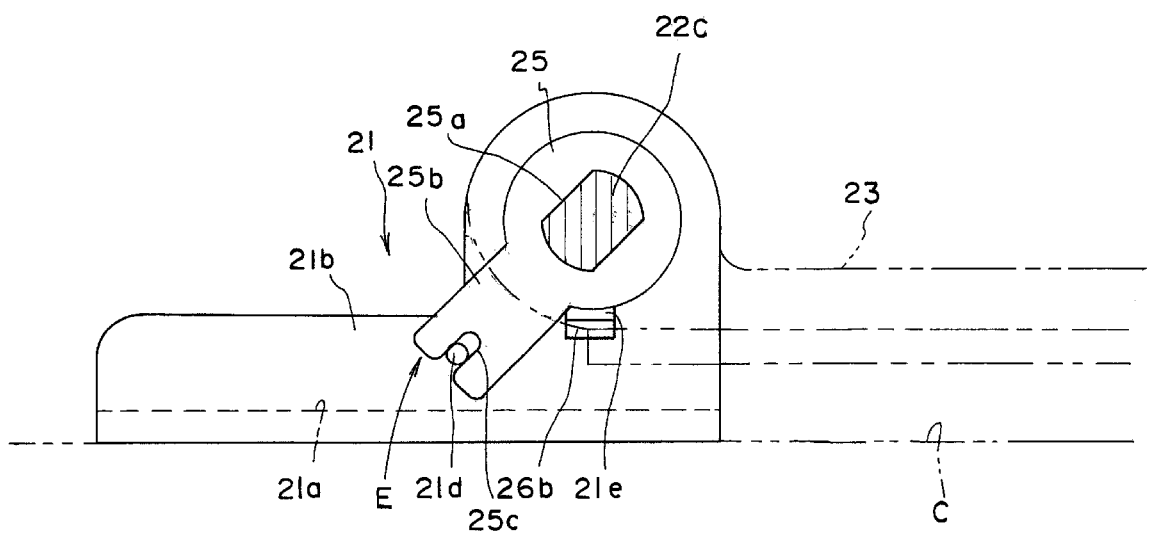
FIG. 16 is a sectional view taken along the line A—A in FIG. 14.
Figure 17:
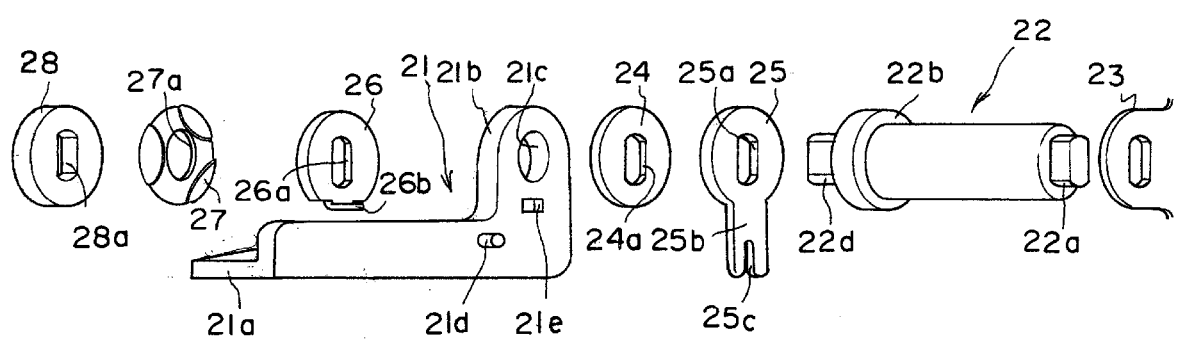
FIG. 17 is an exploded perspective view of the tilting hinge shown in FIG. 13.
Figure 18:
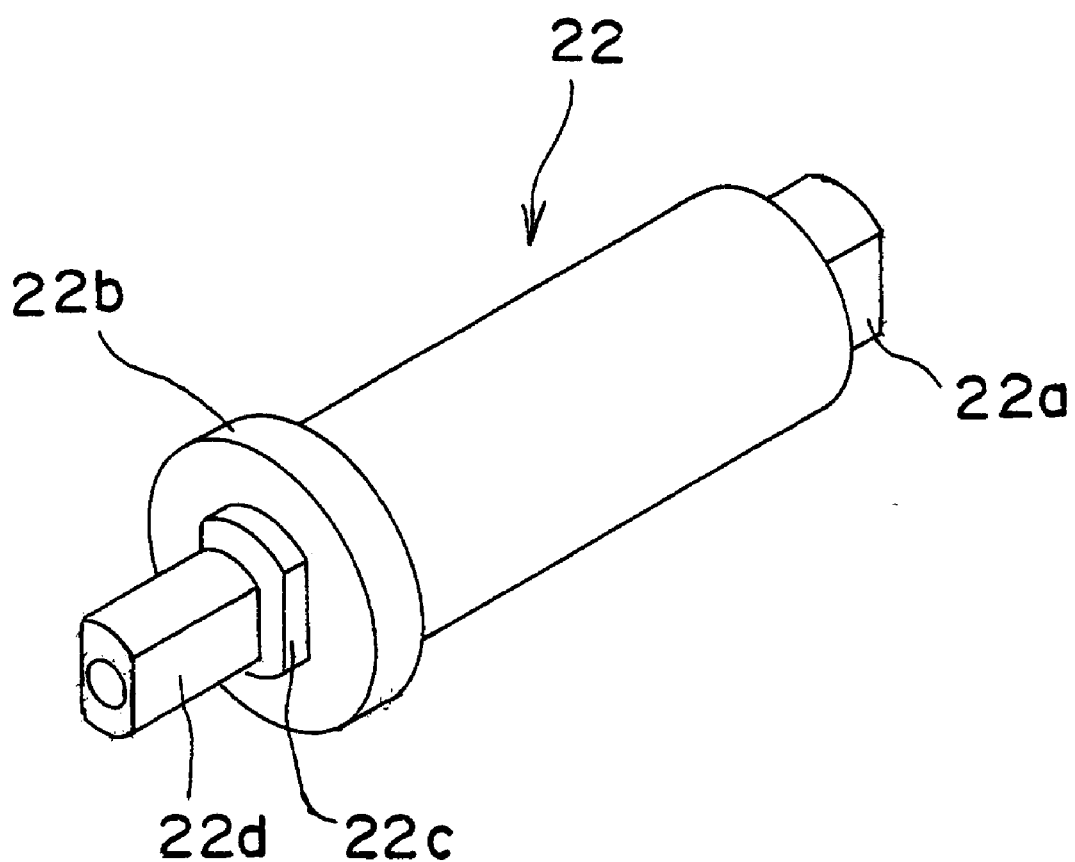
FIG. 18 is a perspective view, enlarged in scale, of the rotating shaft, view from a different direction from that in FIG. 14.

When the opened display screen D is closed to the body C of, the suction mechanism E starts operating at a closed angular position of 20 deg. and the projection 21d on the bearing plate portion 21b moves over the tail portion 25b of the torque plate 25 and enters into the cut 25c in the torque plate 25, as shown in FIG. 15. Namely, since the display screen D is closed with a force raised when the projection 21d enters the cut 25c, the reactive force is eliminated so that the display screen D once closed can be prevented from being opened a little even if no locking mechanism is provided to keep the display screen closed.

Note that in addition to the third embodiment, th engagement lug provided on the outer edge of the first friction washer 24 may not be engaged into the engagement cut in the large-diameter portion 22b of the rotating shaft 22, but it may be engaged on the torque plate 25.

Further, the third embodiment may be modified so that the large-diameter portion 22b of the rotating shaft 22 and torque plate 25 will be engaged on the bearing plate portion 21b for a friction torque to develop between the bearing plate portion 21b and the large-diameter portion 22b and torque plate 25.

Furthermore, the third embodiment may be modified so that the first friction washer 24 is not bound by the rotating shaft 22 or bearing plate portion 21b for a friction torque to develop on either side of the first friction washer 24 accordingly.

Also, the second friction washer 26 may be bound by the rotating shaft 22, elastic member 27 or torque plate 25 (when the torque plate 25 is provided at the second friction washer 26) so that a friction torque will develop between the second friction washer 26 and bearing plate portion 21b or torque plate 25 or the second friction washer 26 may not be bound by any of the above so that a friction torque will develop between the second friction washer 26 and bearing plate portion 21b, torque plate 25 or elastic member 27 accordingly.

Figure 19:
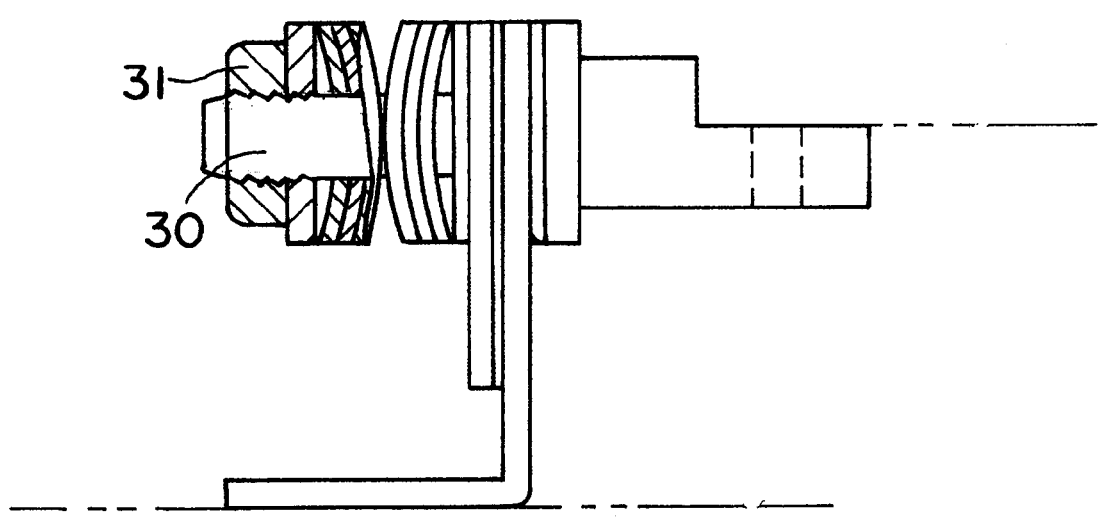
FIG. 19 is a partial sectional view of a variant of the tilting hinge according to the present invention.

Further, the rivet 22f may not be formed but a fastening nut 31 may be screwed on a small-diameter portion 30 of the rotating shaft 22 as shown in FIG. 19. The number of the elastic members 27 and number of the friction washers 24 and 26, used in the third embodiment, are not limited to those specified in the foregoing. To develop a required friction torque for operation of the display screen under support by the tilting hinge, the elastic member and friction washers may be used each in a larger number than one.

What is claimed is:

1. A tilting hinge for a portable computer having a body and a display screen, comprising:

a fixture consisting of a fixing plate portion to be fixed to the body of the portable computer and a bearing plate portion bent perpendicularly to the fixing plate portion;

a rotating shaft consisting of a fixing portion to be fixed to the display screen of the portable computer, a large-diameter portion and a small-diameter portion, and born relatively rotatably in a bearing hole formed in the bearing plate portion of the fixture;

a first friction washer interposed between the large-diameter portion of the rotating shaft and one side of the bearing plate, the first friction washer being engaged with the rotating shaft on the bearing plate portion of the fixture;

a second friction washer provided at another side of the bearing plate and engaged with the rotating shaft;

an elastic assembly of a spring washer or spring washers, a belleville spring or belleville springs, a wave washer or wave washers, the elastic assembly being disposed to abut on the second friction washer;

a set washer disposed to abut on the elastic assembly rotatably with the rotating shaft;

a calked projection provided with an end portion of the small-diameter portion of the rotating shaft abutting on the elastic assembly; and torque changing means for changing torque, the torque changing means comprising a convexity or concavity formed on the bearing plate portion and the first or second friction washer on which there are formed a convexity or concavity opposite to the concavity or convexity on the bearing plate portion.

2. The tilting hinge as set forth in claim 1, wherein the torque changing means is formed from a concavity or convexity formed on the second friction washer and a torque plate having formed thereon a convexity or concavity opposite to the concavity or convexity on the second friction washer.

3. The tilting hinge as set forth in claim 2, wherein a spacer is provided between the torque plate and bearing plate portion.

4. The tilting hinge as set forth in claim 1, wherein the torque changing means is formed from a concavity or convexity formed on the first friction washer and a torque plate having formed thereon a convexity or concavity opposite to the concavity or convexity on the second friction washer.

5. The tilting hinge as set forth in claim 4, wherein a spacer is provided between the torque plate and bearing plate portion.

6. The tilting hinge as set forth in claim 1, wherein when the concavity to abut on the convexity on the first or second friction washer is formed on the bearing plate portion, a spacer is provided in which a convexity projecting to the opposite side to the concavity is received.

7. The tilting hinge as set forth in claim 1, wherein a set nut is provided in place of the to-be-calked projection of the small-diameter portion of the rotating shaft.

8. The tilting hinge as set forth in claim 1, wherein a lubricant is applied between the first friction washers and members which are rotated in friction with the first friction washer when the rotating shaft is rotated.

* * * * *